(12) United States Patent
Hatch et al.

(10) Patent No.: US 10,826,364 B2
(45) Date of Patent: Nov. 3, 2020

(54) CONTINUOUS STATOR WINDING AND ELECTRIC MACHINE COMPRISING THE SAME

(71) Applicant: Faraday & Future Inc., Gardena, CA (US)

(72) Inventors: Erik Hatch, Menifee, CA (US); Dang Dinh Dang, Garden Grove, CA (US)

(73) Assignee: Faraday & Future Inc., Gardena, CA (US)

(*) Notice: Subject to any disclaimer, the term of this patent is extended or adjusted under 35 U.S.C. 154(b) by 0 days.

(21) Appl. No.: 15/139,676

(22) Filed: Apr. 27, 2016

(65) Prior Publication Data

US 2017/0317565 A1 Nov. 2, 2017

(51) Int. Cl.
| | |
|---|---|
| *H02K 3/12* | (2006.01) |
| *H02K 15/04* | (2006.01) |
| *H02K 1/16* | (2006.01) |
| *H02K 3/28* | (2006.01) |
| *H02K 3/48* | (2006.01) |
| *H02K 15/02* | (2006.01) |
| *H02K 15/06* | (2006.01) |

(52) U.S. Cl.
CPC ......... *H02K 15/0414* (2013.01); *H02K 1/165* (2013.01); *H02K 3/12* (2013.01); *H02K 3/28* (2013.01); *H02K 3/48* (2013.01); *H02K 15/026* (2013.01); *H02K 15/06* (2013.01)

(58) Field of Classification Search
CPC ............ H02K 1/165; H02K 3/12; H02K 3/28; H02K 3/48

USPC ......................................................... 310/208
See application file for complete search history.

(56) References Cited

U.S. PATENT DOCUMENTS

| | | | |
|---|---|---|---|
| 6,222,295 B1* | 4/2001 | Umeda .................... | H02K 3/12 310/179 |
| 2011/0012471 A1* | 1/2011 | Dang ....................... | H02K 3/12 310/201 |
| 2015/0028704 A1* | 1/2015 | Ohsawa ............. | H02K 15/0056 310/71 |

* cited by examiner

*Primary Examiner* — Michael Andrews
(74) *Attorney, Agent, or Firm* — Knobbe, Martens, Olson & Bear, LLP

(57) ABSTRACT

Certain aspects relate to a continuous winding formed from a conductor of rectangular cross-section, the winding having a compound bend in the crowns connecting successive linear segments where the compound bend does not stress the conductor insulation to its failure point. The compound bend can be formed by applying force to the conductor in a first direction, thereby shaping a first bend in the conductor to form a u-shaped conductor having a crown and two linear segments, where the crown includes a v-shaped bend and two straight segments on either side of the v-shaped bend that each connect to one of the linear segments. A second bend can be formed by applying force to the conductor in a second direction perpendicular to the first direction. The shape of the second bend can depend on the desired radius of the winding when circularly wound and positioned in a stator.

22 Claims, 13 Drawing Sheets

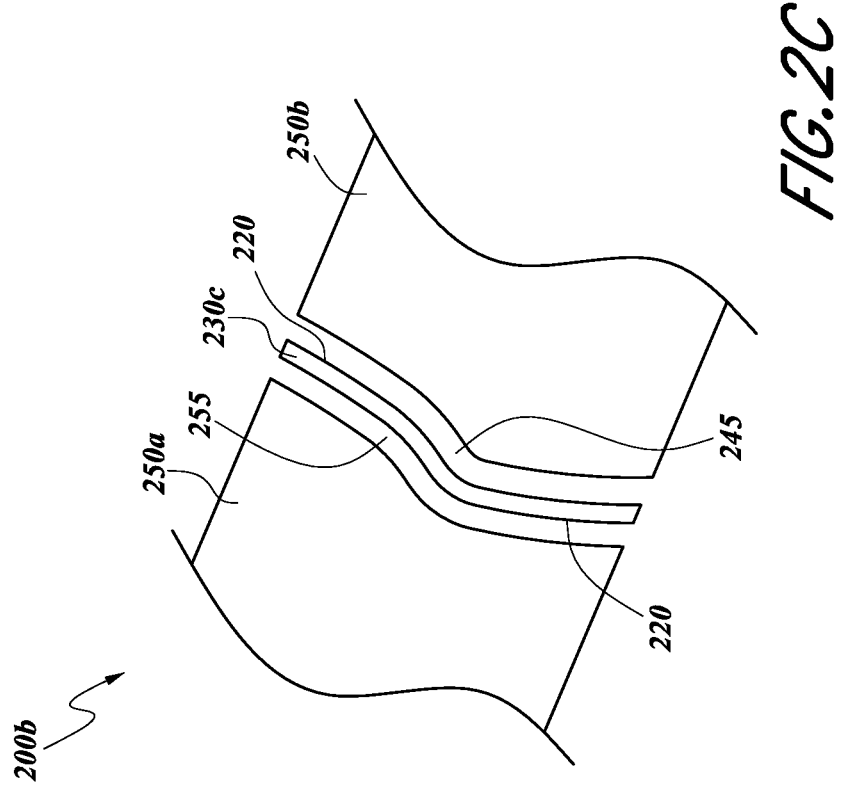

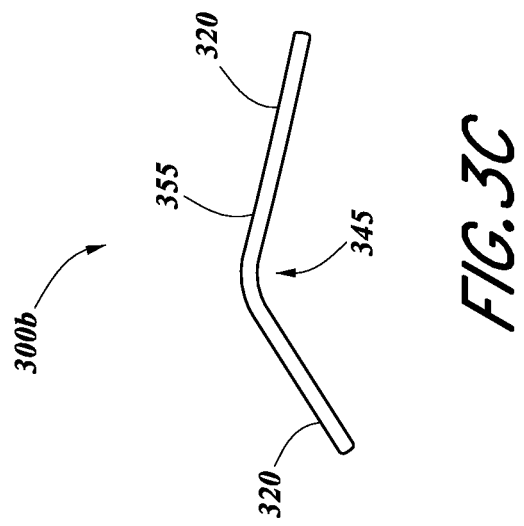
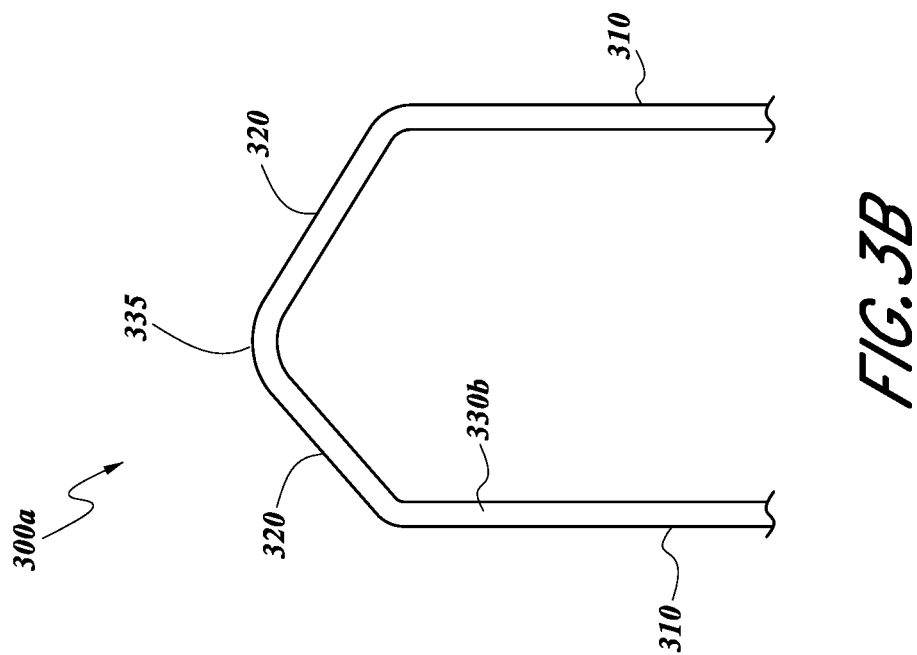

CONTINUOUS STATOR WINDING AND ELECTRIC MACHINE COMPRISING THE SAME

TECHNICAL FIELD

The systems and methods disclosed herein are directed to electrical machines, and, more particularly, to electrical machines having continuous stator windings formed without transitional transpositions.

BACKGROUND

Electric machines include both electric motors and electric generators. In recent years, high efficiency electric motors have become desirable to meet the challenges of providing power without the usage of fossil fuel sources, for example in hybrid and electric vehicles. Interior permanent magnet (IPM) motors have become popular due to their high efficiency performance, as IPM electric machines have become increasingly efficient synchronous motors due to advances in high-energy permanent magnet technology, smart inverters, and digital controllers. IPM electric machines have magnets built into the interior of the rotor. The rotor is rotatable within a stator which includes multiple windings to produce a rotating magnetic field in the frame of reference of the stator.

SUMMARY

The electric machine stator windings disclosed herein have several features, no single one of which is solely responsible for its desirable attributes. Without limiting the scope as expressed by the claims that follow, the more prominent features of the windings will now be discussed briefly. After considering this discussion, and particularly after reading the section entitled "Detailed Description" one will understand how the features of the windings provide several advantages over traditional systems and methods.

One aspect relates to an electric machine comprising a rotor; a stator positioned around the rotor, the stator comprising first and second end faces; a plurality of stator teeth extending inward toward the rotor; a plurality of slots each formed between adjacent stator teeth of the plurality of stator teeth, the plurality of slots extending between the first and second end faces and at least partially open toward the rotor; and a continuous winding passing successively through at least some of the plurality of slots of the stator, the continuous winding comprising a conductor having a rectangular cross-section defining first, second, third, and fourth exterior faces of the conductor, a plurality of crowns formed in the conductor, and a plurality of linear segments of the conductor, wherein pairs of successive linear segments of the plurality of linear segments are connected by a crown of the plurality of crowns, and wherein each linear segment of the plurality of linear segments is positioned in a corresponding one of the plurality of slots with the first exterior face facing the rotor.

Each crown of the plurality of crowns can comprise first and second straight segments joined by a bent segment, wherein the bent segment includes a compound bend formed in the conductor at a peak of the crown. The first and second exterior faces of the conductor can be opposing and the third and fourth exterior faces of the conductor can be opposing, and the compound bend can include, when viewed from a perspective orthogonal to the first and second exterior faces, a v-shaped bend, and when viewed from a perspective orthogonal to the third and fourth exterior faces, an s-shaped bend. The first and second exterior faces of the conductor can be opposing and the third and fourth exterior faces of the conductor can be opposing, and the compound bend can include, when viewed from a perspective orthogonal to the first and second exterior faces, a first v-shaped bend, and when viewed from a perspective orthogonal to the third and fourth exterior faces, a second v-shaped bend.

Each of the plurality of crowns can positioned outside of the stator passing across a portion of one of the first and second end faces. Successive crowns of the plurality of crowns formed in the conductor can pass across opposing end faces of the first and second end faces of the stator. The bent segment of a crown of the plurality of crowns can nest with the bent segment of an adjacent crown of the plurality of crowns.

Another aspect relates to a stator for an electric machine, the stator comprising an inner diameter and an outer diameter; first and second end faces; a plurality of stator teeth extending inward toward the inner diameter; a plurality of slots each formed between adjacent stator teeth of the plurality of stator teeth, the plurality of slots extending between the first and second end faces and at least partially open along the inner diameter; and a continuous winding passing successively through at least three slots of the plurality of slots, the continuous winding comprising a conductor having a rectangular cross-section defining at least a first exterior face of the conductor, the winding positioned in each of the at least three slots with the first exterior face facing the inner diameter.

The continuous winding can comprise a plurality of linear segments of the conductor, and each pair of successive linear segments of the plurality of linear segments can be connected by one of a plurality of crowns formed in the conductor. Each crown of the plurality of crowns can comprise first and second straight segments joined by a compound bend formed in the conductor. The first and second straight segments of each crown of the plurality of crowns can be angled toward the outer diameter of the stator. A first of the at least three slots is can be separated from a second of the at least three slots by five other slots of the plurality of slots. The continuous winding can be radially inserted into the at least three slots.

Another aspect relates to a continuous stator winding comprising a conductor having a rectangular cross-section defining first, second, third, and fourth exterior faces of the conductor, the first exterior face opposing the second exterior face, the third exterior face opposing the fourth exterior face; a plurality of linear segments formed in the conductor, each linear segment of the plurality of linear segments positioned parallel to the other linear segments of the plurality of linear segments; and a plurality of crowns formed in the conductor, each crown of the plurality of crowns comprising first and second straight segments joined by a bent segment and connecting successive linear segments of the plurality of linear segments such that, when the conductor is radially wound, the first exterior face of each of the plurality of linear segments faces inward.

The bent segment can include a compound bend formed in the conductor. The compound bend can include, when viewed from a perspective orthogonal to the first and second exterior faces, a v-shaped bend, and when viewed from a perspective orthogonal to the third and fourth exterior faces, an s-shaped bend. The compound bend can include, when viewed from a perspective orthogonal to the first and second exterior faces, a first v-shaped bend, and when viewed from a perspective orthogonal to the third and fourth exterior faces, a second v-shaped bend.

The conductor can comprise an insulating coating. The bent segment of each of the plurality of crowns can be configured to minimize mechanical stress on the insulating coating.

The bent segment of a first subset of the plurality of crowns can be formed having a first compound bend, wherein the bent segment of a second subset of the plurality of crowns is formed having a second compound bend shaped differently than the first compound bend. The continuous stator winding can be wound into a double-layer circular configuration, the double-layer circular configuration comprising a first length of the conductor including the first subset of the plurality of crowns wound into an inner circular row, and a second length of the conductor including the second subset of the plurality of crowns wound into an outer circular row.

Another aspect relates to a method of manufacturing a stator for an electric machine, the method comprising providing a stator having an inner diameter and an outer diameter, first and second end faces, a plurality of stator teeth extending inward toward the inner diameter, and a plurality of slots each formed between adjacent stator teeth of the plurality of stator teeth, the plurality of slots extending between the first and second end faces and at least partially open along the inner diameter; forming a continuous winding, wherein the forming comprises providing a conductor having a rectangular cross-section, the rectangular cross-section defining first, second, third, and fourth exterior faces of the conductor, wherein the first exterior face opposes the second exterior face and the third exterior face opposes the fourth exterior face, and shaping the conductor to form a plurality of crowns and a plurality of linear segments, wherein pairs of successive linear segments of the plurality of linear segments are connected by a crown of the plurality of crowns; wrapping the continuous winding into a circular configuration; and radially inserting the continuous winding into corresponding slots of the plurality of slots such that, for each linear segment of the plurality of linear segments, the first exterior face faces the inner diameter of the stator.

Shaping the conductor can comprise forming each crown of the plurality of crowns to have first and second straight segments joined by a bent segment, the first and second straight segments connecting successive linear segments of the plurality of linear segments such that, when the conductor is radially wound, the first exterior face of each of the successive linear segments faces the inner diameter of the stator.

The method can further comprise forming the bent segment as a compound bend at a peak of the crown. Forming the bent segment as a compound bend can comprise forming a v-shaped bend in the crown, the v-shaped bend viewable from a perspective orthogonal to the first and second exterior faces, and forming an s-shaped bend in the crown, the s-shaped bend viewable from a perspective orthogonal to the third and fourth exterior faces. Forming the bent segment as a compound bend can comprise forming a v-shaped bend in the crown, the v-shaped bend viewable from a perspective orthogonal to the first and second exterior faces, and forming an asymmetrical v-shaped bend in the crown, the asymmetrical v-shaped bend viewable from a perspective orthogonal to the third and fourth exterior faces.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIG. 2C illustrates a top view of the crown of the continuous winding of FIG. 2A and example molds for forming a second bend of the crown.

FIG. 3B illustrates a side view of a crown of the continuous winding of FIG. 3A.

FIG. 3C illustrates a top view of the crown of the continuous winding of FIG. 3A.

DETAILED DESCRIPTION

Introduction

Figure 1A:
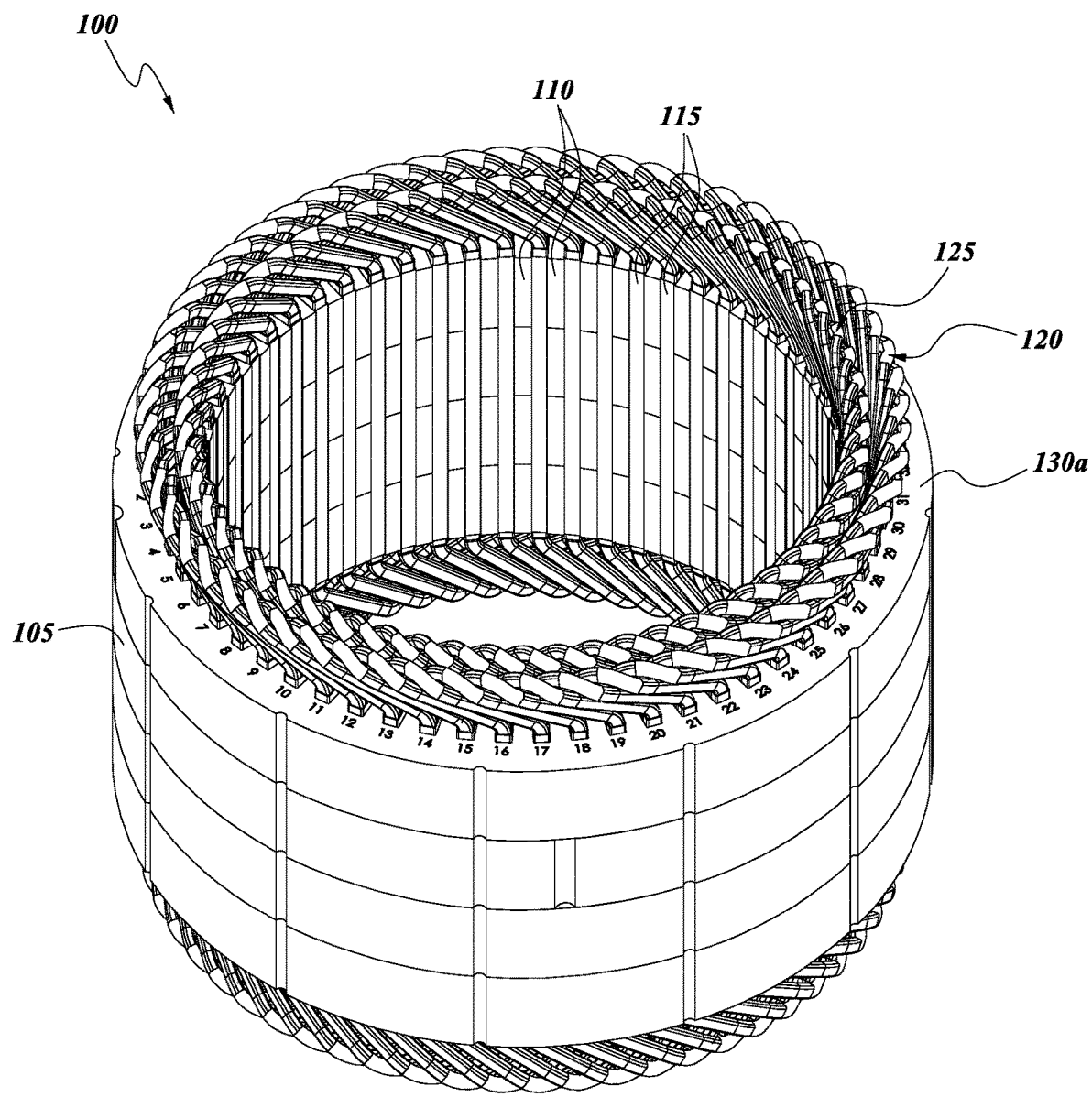
FIGS. 1A-1D illustrate various views of a stator having continuous, radially-inserted windings as described herein.

In general, this disclosure is related to continuous stator windings for electric machines, the windings formed from a conductor having a rectangular cross-section, crown portions of the conductor having bent sections without transitional transpositions. Such windings have improved integrity of the insulating coating of the winding conductors compared to existing windings. Because winding insulation failure can cause failure of the electric machine, the disclosed windings can contribute to greater longevity of electric machines.

A stator can include a number of teeth and slots located in radial direction along its internal circumference, with the teeth and slots extending along the whole axial length of the stator between first and second end faces of the stator. In some stators the stator teeth have no tooth tips, and the slots are termed "open" as the slot opening is the same width as the slot itself. In some stators the stator teeth have small protrusions extending from either side of the tooth tips, and the slots are termed "partially closed" as the width of the slot opening is smaller than the width of the slot itself. Using various techniques well known by those skilled in the art, the stator winding is embedded into the slots according to a certain phase order.

For example, conductor segments can be bent into U-shapes, such that the conductor segments form a U-shaped crown with two legs. These conductor segments are often referred to as "hairpins" because of their shape. Such hairpin conductors can be inserted into two slots through one end face of the stator. A number of hairpin conductors can be inserted to fill the slots of the stator and the open (non-crown) end of each leg can be bent as needed and welded to an adjacent hairpin leg according to the connection requirements of the windings. While this allows for axial insertion of the conductors, the many weld points at the open ends of the hairpin conductors create weak points in the insulating coating of the conductors. The weld points can lead to failure of the electric machine.

As another example, a continuous conductor can be wound into a wave or looped pattern and then radially inserted into the stator core through the slot openings. When these continuous conductors are formed using a conductor having a rectangular cross-section, the crowns forming the connections between the linear segments inserted into the stator conventionally include a transitional transposition or cross-over of the conductor. In the transitional transposition of the crown, the conductor is folded over on itself such that a first face of the rectangular conductor that faces inward toward the rotor in one slot crosses over in the transitional transposition and thus faces outward toward the stator backiron in a successive slot in the winding. At the transitional transposition the winding has an increased thickness due to the conductor doubling over on itself, referred to as a "knuckle," which can interfere with a compact arrangement of the crowns outside of the stator. As such, this knuckle in the conductor crown is typically flattened to have the same thickness as the conductor without doubling. Such flattening breaks the insulating coating on the conductor, creating a potential failure point at each crown of the continuous winding. A typical winding can have 90 to 100 of such crowns, and multiple windings can be positioned in a single stator.

The above-described problems, among others, are addressed in some implementations by the continuous stator windings described herein. The described stator windings include a conductor having a rectangular cross-section and an electrically insulating coating around the conductor. The conductor is formed into a zig-zag or crank shape having a number of parallel linear segments connected by crowns, where each crown includes a compound bend designed to not stress the insulation past its elongation or cracking point. Thus the described conductors can include no weld or knuckle related failure points in the insulation at the crowns. It will be appreciated that each winding of the stator can include a weld for coupling the winding to an input and/or output.

The edges of the rectangular cross-section define first, second, third, and fourth exterior faces of the conductor. The first and second exterior faces can be defined by the longer edges of the rectangular cross-section and oppose one another. The third and fourth exterior faces can be defined by the shorter edges of the rectangular cross-section and oppose one another. In other embodiments, the first and second exterior faces can be defined by the shorter edges of the rectangular cross-section and oppose one another, and the third and fourth exterior faces can be defined by the longer edges of the rectangular cross-section and oppose one another. It will be appreciated that the disclosed techniques can also be applied to conductors having a square cross-section.

A first bend of the compound bend is formed in a crown by shaping the conductor into a v-shape that compresses a portion of either the third or fourth exterior face and elongates a portion of the other of the third or fourth exterior faces. Thus, the v-shape would be visible when viewing the conductor orthogonally to the first and second exterior faces. As used herein, a "v-shape" can refer to two straight segments joined by an angled or bent portion that can be either a sharp bend or a contoured bend. This shaping can be accomplished by applying force to the conductor along a first direction, for example by pressing the conductor between two halves of a mold or by wrapping the conductor around a single mold with sufficient force. The straight segments can each have an additional angle formed between the straight segment and a linear segment of the conductor that will be positioned in a stator slot.

A second bend of the compound bend is formed in the crown after formation of the first bend by shaping the conductor into an s-shape, asymmetrical v-shape, or second v-shape. The s-shape is formed by compressing and elongating portions of the first and second exterior faces, and the asymmetrical v-shape is formed by compressing a portion of either the third or fourth exterior face and elongating a portion of the other of the third or fourth exterior faces. Thus, the s-shape or asymmetrical v-shape would be visible when viewing the conductor orthogonally to the third and fourth exterior faces. As used herein, an "s-shape" can refer to three straight or curved segments joined by two angled or bent portions that can be either sharp or contoured bends. As used herein, an "asymmetrical v-shape" can refer to two straight segments of uneven lengths joined by an angled or bent portion that can be either a sharp or contoured bend. This shaping can be accomplished by applying force to the conductor along a second direction perpendicular to the first direction, for example by pressing the conductor between two halves of a mold or by wrapping the conductor around a single mold with sufficient force. Where the winding design includes multiple conductors per slot, the crowns of the winding or windings will form a number of circular rows crossing over the end faces of the stator. To provide a compact nesting configuration between adjacent crowns, the second bend of the conductor can be shaped into the s-shape, the asymmetrical v-shape, or some blend of these two shapes depending on the desired radius of that circular row of the winding when positioned in the stator.

The first and second bends are designed such that the compression and elongation of the various exterior faces for formation of the compound bend does not stress the insulating coating of the conductor to failure. Thus, in optimal conditions the compound bend can provide for a continuous winding with no breaks in the insulation at the crowns.

After formation of the first and second bends in the crown, the winding can be wrapped into a circular configuration. In the circular configuration the linear segments of the winding are inserted radially into a stator, where successive linear segments of the conductor in the circular configuration alternate between two layers, such that a single circular configuration provides two conductors per slot. The same exterior face of each of the linear segments faces inwardly, that is, toward the inner diameter of the stator and toward a rotor of an assembled electric machine. This can be the first exterior face—one of the faces defined by a long side of the rectangular cross-section—in some embodiments. Successive linear segments of the winding can be positioned in stator slots that are spaced apart by a predetermined amount based on the winding configuration. One example can have five stator slots between successive linear segments positioned in their corresponding stator slots. As described, successive linear segments of the conductor alternate between two layers, such that a first linear segment can be positioned in a first layer position in a first slot, a second linear segment successive with the first linear segment can be positioned in a second layer position in a second slot spaced apart from the first slot, a third linear segment successive with the second linear segment can be positioned in the layer position in a third slot spaced apart from the second slot, and so on. This can continue until both layer positions are filled in each slot in the stator corresponding to the phase of the conductor. Some stators can have two, three, or more circular configurations of the disclosed windings inserted in each slot for four, six, or more conductors per slot. Once the winding has been wrapped into the circular configuration and inserted into the stator, adjacent crowns in a circular row of the winding can nest with one another via the second bend of the compound bend. As used herein with respect to windings, "successive" refers to two components that are formed from proximate portions of the conductor while "adjacent" refers to conductor portions that are proximate to one another after insertion into the stator.

Some windings as described herein can include a first length having crowns formed with an s-shaped second bend in the compound bend and a second length having crowns formed with an asymmetrical v-shaped second bend in the compound bend. Such windings can be arranged in a double-layer circular configuration such that the crowns having the s-shaped second bend are positioned in an interior portion of the double circular configuration and the crowns having an asymmetrical v-shaped second bend are positioned in an exterior portion of the double circular configuration. Such windings would have four linear segments of the conductor positioned in each stator slot corresponding to the phase of that particular winding. Some stators can have two of such double-layer circular configuration windings inserted in each slot for a total of eight conductors per slot, with the conductors in a slot arranged in an alternating fashion with respect to layer position.

The described windings can be implemented in stators with open slots or with partially closed slots. As one example of radially-inserting the disclosed windings into partially closed slots, the stator teeth include tips shaped to provide an initially open slot such that conductors having the same or a similar width as the interior of the slot can be inserted through the opening to achieve a high slot fill ratio. The interior of the slot may include an insulating lining such as paper and the tooth tips can prevent inserted conductors from bunching up the insulating lining. The lining can provide abrasion protection to the insulating coating of the conductors during insertion. Pressure can be applied to the tooth tips after insertion of the conductors to partially close the slots, thereby retaining the conductors within their respective slots. In some implementations a wedge can be inserted over the conductors to aid in retention, for example where the conductors are compressed into the slot to achieve a high slot fill ratio.

One described implementation of the disclosed windings is use in an electric vehicle motor. The disclosed windings can be used in electric motors for other applications as well. The disclosed windings can also be advantageous for use in other types of electric machines, for example in generators, such as generators for use in wind or water turbines. Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Example Continuously Wound, Radially-Inserted Conductors

Figure 1B:
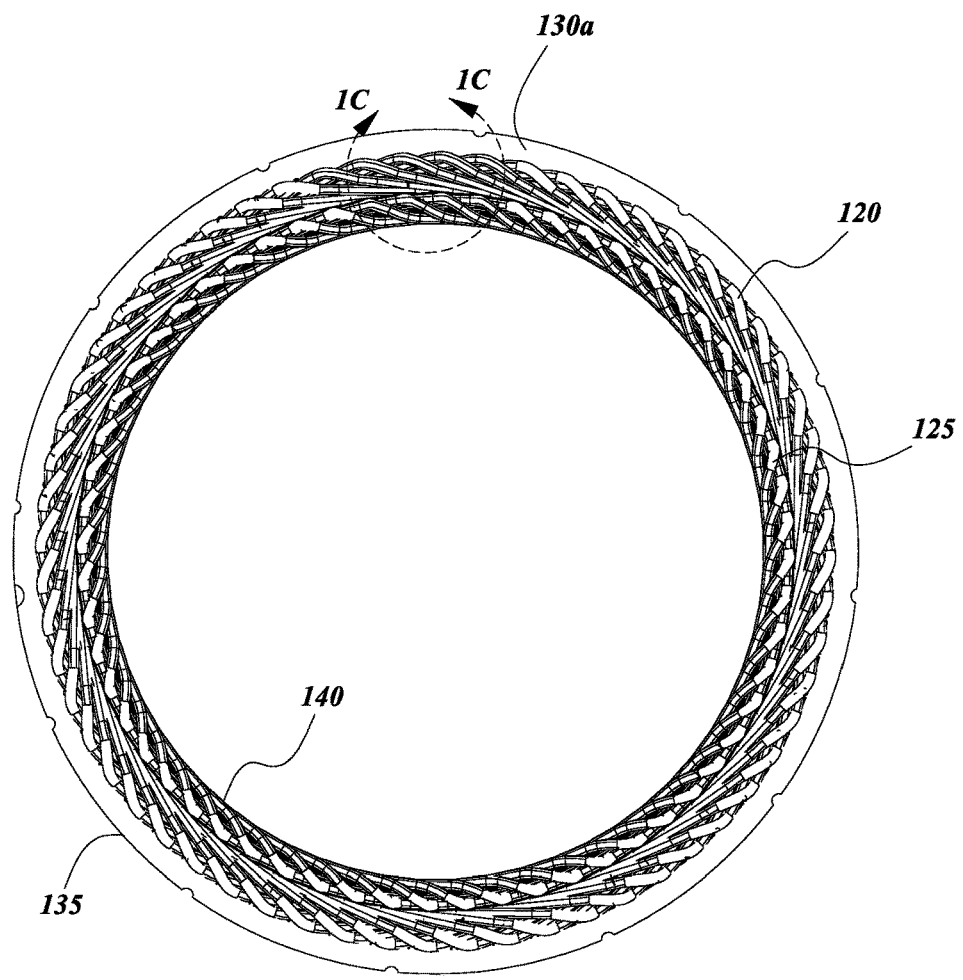
Figure 1C:
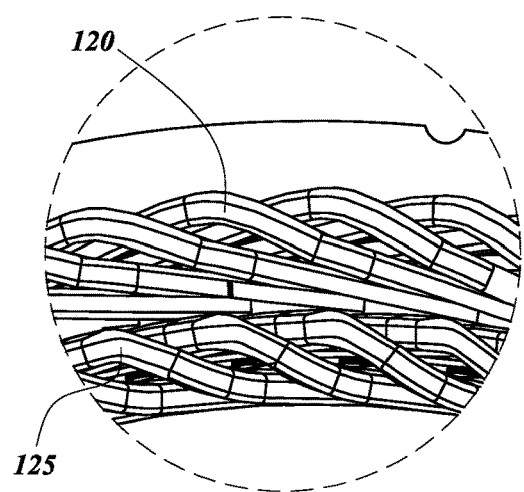
Figure 1D:
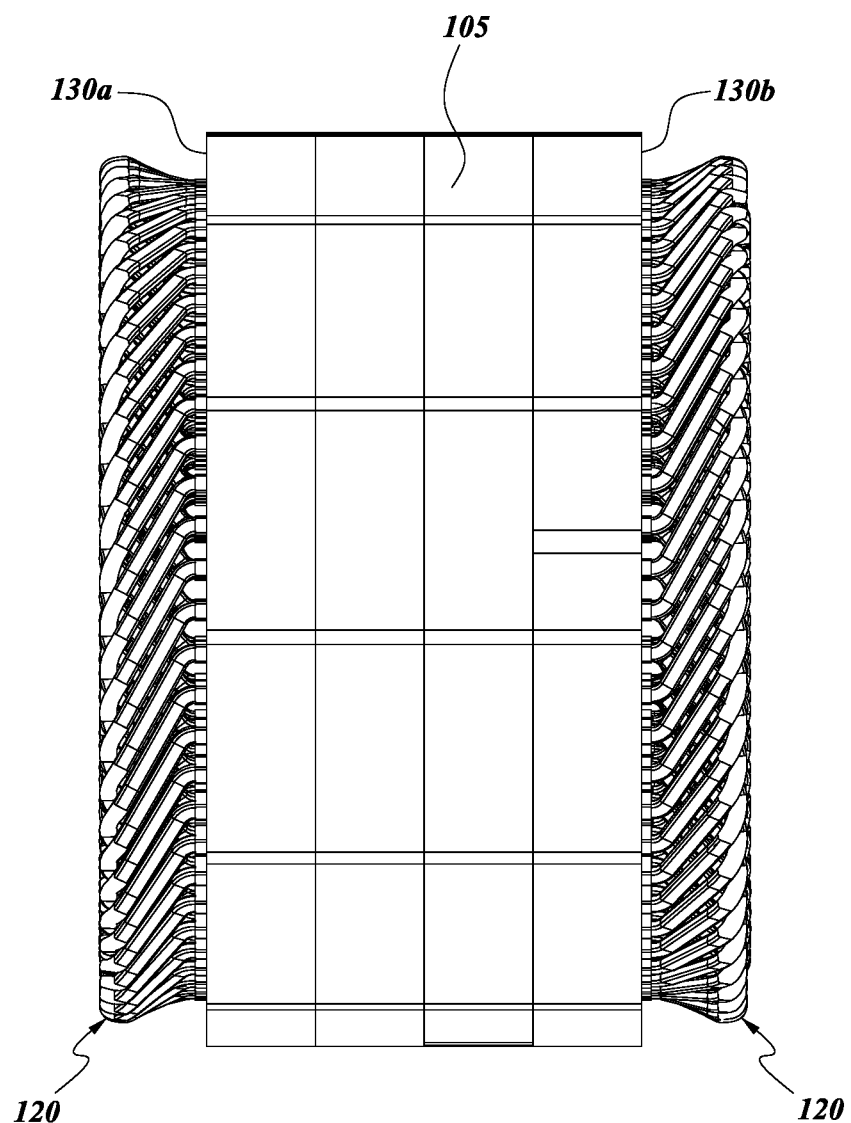

FIG. 1A illustrates a front, top perspective view of a stator 105 for an electric machine, the stator 105 having continuous, radially-inserted windings 125, 120 formed with insulation-preserving crowns as described herein. FIG. 1B illustrates a top view of the stator 105 and windings 125, 120. FIG. 1C illustrates a zoomed-in view of a portion of the windings 125, 120 to illustrate the nesting configuration of adjacent winding crowns. FIG. 1D illustrates a front view of the stator 105 and windings 125, 120.

The stator 105 is formed as a magnetically permeable cylindrical stack having a stator backiron along the outer diameter 135 (visible at end face 130A in FIG. 1A) and slots 115 formed between stator teeth 110 along the inner diameter 140. In some embodiments, as illustrated, the slots 115 can be partially closed, as the stator teeth 110 can contain tooth-tips along the inner diameter of stator 105. Other embodiments may have fully open slots in the stator 105 where the stator teeth are shaped so that the opening of the stator slot is the same width as the inner width of the slot.

The backiron and teeth 110 of the stator 105 can be made of a stack of multiple thin layers of electrical steel, the stack having first and second end faces 130A, 130B. In some examples, the layers of electrical steel can be punched to produce the desired cross-sectional topology, stacked, and laser welded together. In one embodiment, the stator layers can be steel laminate with insulation and/or adhesive provided on both faces. Generally, the stator 105 is made of any magnetically permeable material suitable for conducting magnetic flux.

Linear segments of the windings 125, 120 can be positioned in the stator slots 115 with crowns of the windings 125, 120 crossing over the first and second end faces 130A, 130B. As shown in FIG. 1B, multiple layers of circular windings can be positioned in stator 105, with an inner layer 125 and an outer layer 120 illustrated. Other embodiments can have three, four, or more layers of circular windings depending on the desired number of conductors per stator slot 115. The exposed crowns of at least the inner winding 125 can be angled away from the inner diameter 140 of the stator 105 to allow for insertion of a rotor into the stator 105, such that an inner diameter of the nested portion of the inner winding 125 is equal to or greater than the inner diameter 140 of the stator 105. FIG. 1C illustrates a close up view of the nested windings as depicted in FIG. 1B. As illustrated, adjacent conductors nest with one another in the region of the compound bend in the crown, and a conductor transitions between first and second stator slot layers at the compound bend. At the successive crown (not illustrated, positioned over the opposing end face 130b of the stator) the conductor transitions back from the second stator slot layer to the first stator slot layer. Thus, the double-layer circular configuration fills four stator slot layers. As shown in FIG. 1D, the windings can form nested configurations outside of both of the first and second end faces 130A, 130B of the stator 105.

Each conductor can have a rectangular cross-section, can be composed of a single, solid conductor or of a number of thin rectangular wires or strands, and can include an electrically insulating coating around its exterior faces. Though referred to as separate windings 120, 125, these winding layers can be formed as a single winding from a single, continuous conductor in some embodiments, where a first portion of the conductor is shaped to form the crowns of the inner layer 125 and a second portion of the conductor can be shaped to form the crowns of the outer layer 120. Greater or fewer layers can be used. Further, in some examples of three-phase electric machines each layer of the winding can include three conductors. For example, three windings formed with crowns as described herein can be wound such that the axes of the three windings are displaced by 120°. When the three windings are excited with sinusoidal currents, a rotating magnetic field is produced. Other three-phase winding implementations can achieve a similar effect by using a single distributed winding.

The stator 105 can be used in an electric machine, for example an interior permanent magnet electric machine. A rotor assembly (not illustrated) is placed concentrically within the stator assembly such that an air gap exists between the outer diameter of the rotor and the tips of the stator teeth 110 that form the inner diameter 140 of the stator 105. The magnetically permeable rotor iron is used to conduct magnetic flux, and some implementations of the rotor can include one or more permanent magnets. The electric machine also includes an electrical connection (not illustrated) coupled to each stator winding 120, 125.

Figure 2A:
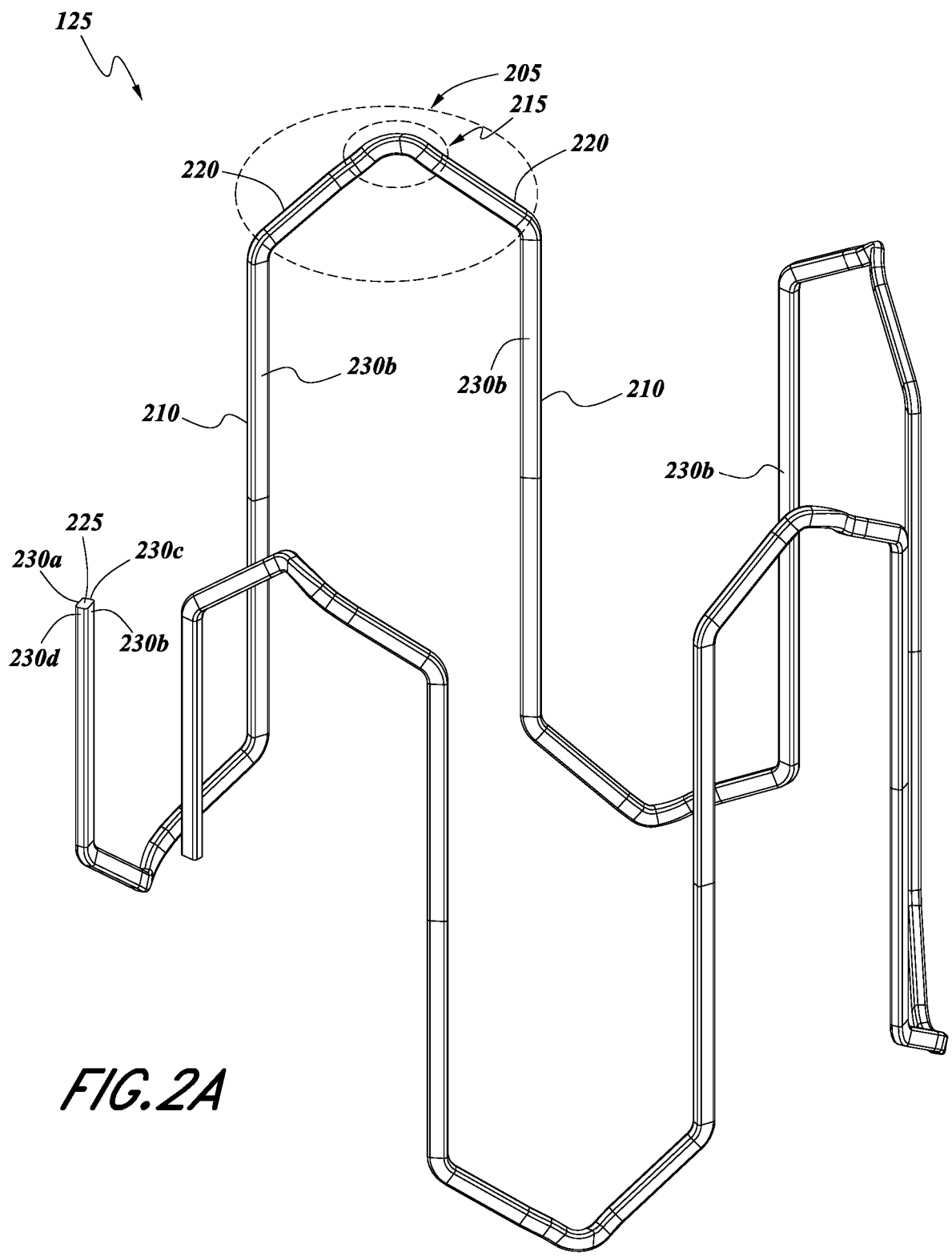
FIG. 2A illustrates a portion of the inner portion of the continuous winding of FIGS. 1A-1D.

FIG. 2A illustrates a portion of the inner portion 125 of the continuous winding of FIGS. 1A-1D. The winding includes a number of linear segments 210 positioned parallel to one another, with successive linear segments connected by crowns 205. The linear segments 210 can be radially inserted into the slots of a stator according to a determined winding pattern. The crown 205 includes two substantially straight segments 220 and a compound bend 215 at a peak of the crown between the straight segments 220, the compound bend 215 designed to not stress insulation of the winding conductor to failure.

The conductor of the winding has a rectangular cross-section 225 composed of a single, solid conductor or of a number of thin rectangular wires or strands. The edges of the cross-section 225 define first 230B, second 230A, third 230C, and fourth 230D exterior faces of the conductor. The conductor can include an electrically insulating coating around its exterior faces 230A-230D. Though discussed and illustrated primarily in terms of a conductor having rectangular cross-section where two sides of the cross-section are longer than the two other sides, it will be appreciated that the disclosed techniques can also be applied to conductors having a square cross-section.

Figure 2B:
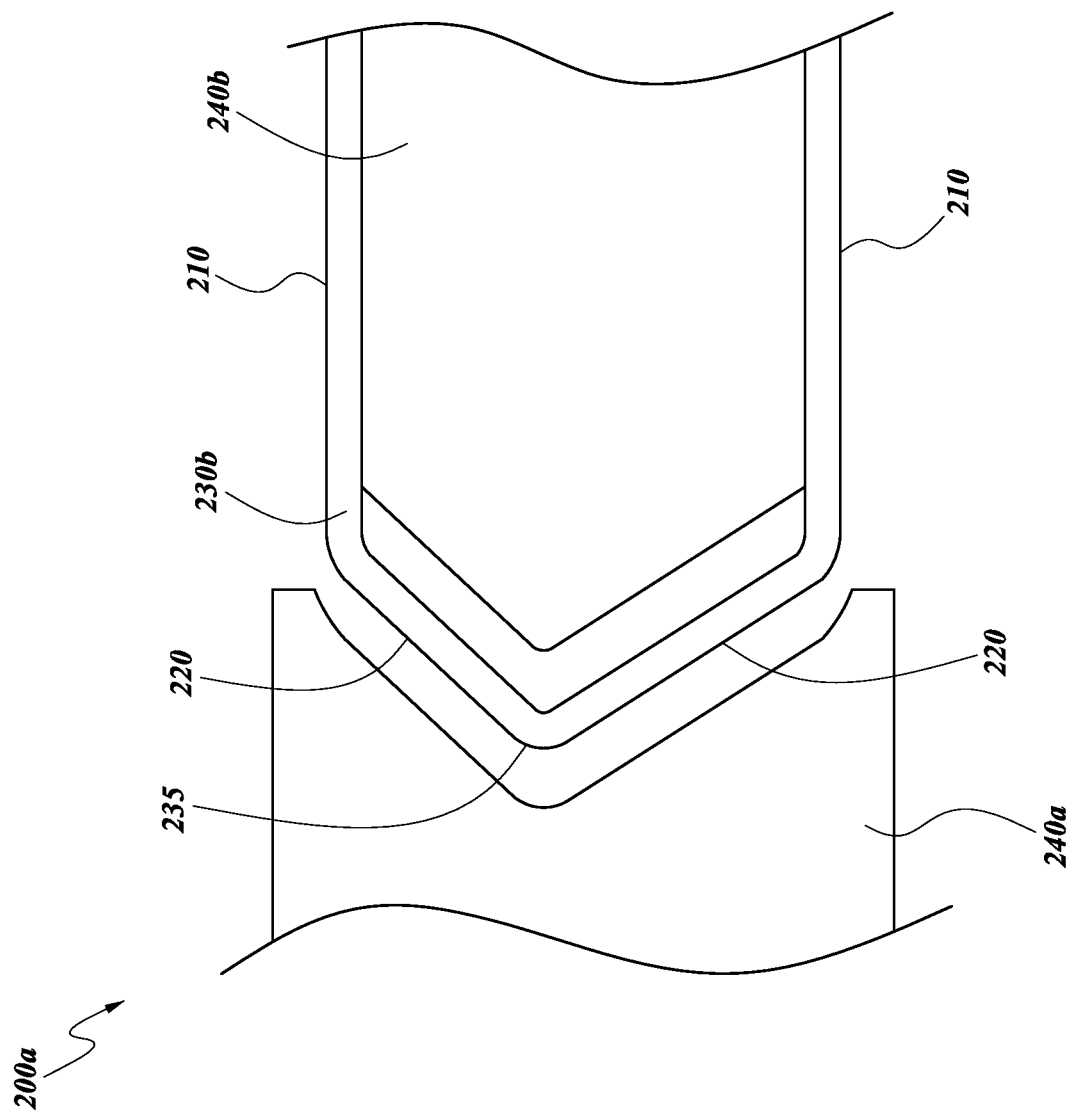
FIG. 2B illustrates a side view of a crown of the continuous winding of FIG. 2A and example molds for forming a first bend of the crown.

FIG. 2B illustrates a side view 200A from a perspective orthogonal to the first exterior face 230B of the crown 205 of FIG. 2A as well as a portion of two successive linear segments 210 of the continuous winding. FIG. 2A also illustrates example corresponding mold portions 240A, 240B for forming a first bend 235 of the crown 205. The first bend 235 of the compound bend can be formed by shaping the conductor into a v-shape. In the specific configuration of the conductor if the illustrated crown, mold portions 240A, 240B create a v-shaped bend that compresses a portion of the fourth exterior face 230D and elongates a portion of the third exterior face 230C. As illustrated, this shaping can be accomplished by applying force to the conductor along a first direction between corresponding female 240A and male 240B portions of a mold. In other examples, the first bend 235 can be formed by wrapping the conductor around a single mold with sufficient force. Along with formation of the first bend 235, the straight segments 220 can each have an additional bend formed between the straight segment 220 and the connected linear segment 210.

FIG. 2C illustrates a top view 200B from a perspective orthogonal to the third exterior face 230C of the crown 205 of FIG. 2A. FIG. 2C also illustrates example mold portions 250A, 250B for forming a second bend 245, 255 of the crown.

The second bend 245, 255 of the compound bend 215 can be formed in the crown 205 after formation of the first bend 235. In the example of FIG. 2C, the second bend is formed by shaping the conductor into an s-shape with two radiused bends 245, 255. The s-shape is formed by compressing and elongating portions of the first and second exterior faces 230A, 230B. As illustrated, this shaping can be accomplished by applying force to the conductor along a second direction by pressing the conductor between two portions 250A, 250B of a mold. The second direction perpendicular to the first direction is perpendicular to the first direction. The second bend 245, 255 can provide for a compact nesting configuration between adjacent crowns in a circular row of the winding when positioned in the stator.

The first 235 and second 245, 255 bends are designed such that the compression and elongation of the various exterior faces for formation of the compound bend 215 does not stress the insulating coating of the conductor to failure. Thus, in optimal conditions the compound bend 215 can provide for a continuous winding with no breaks in the insulation at the crowns 205.

Figure 3A:
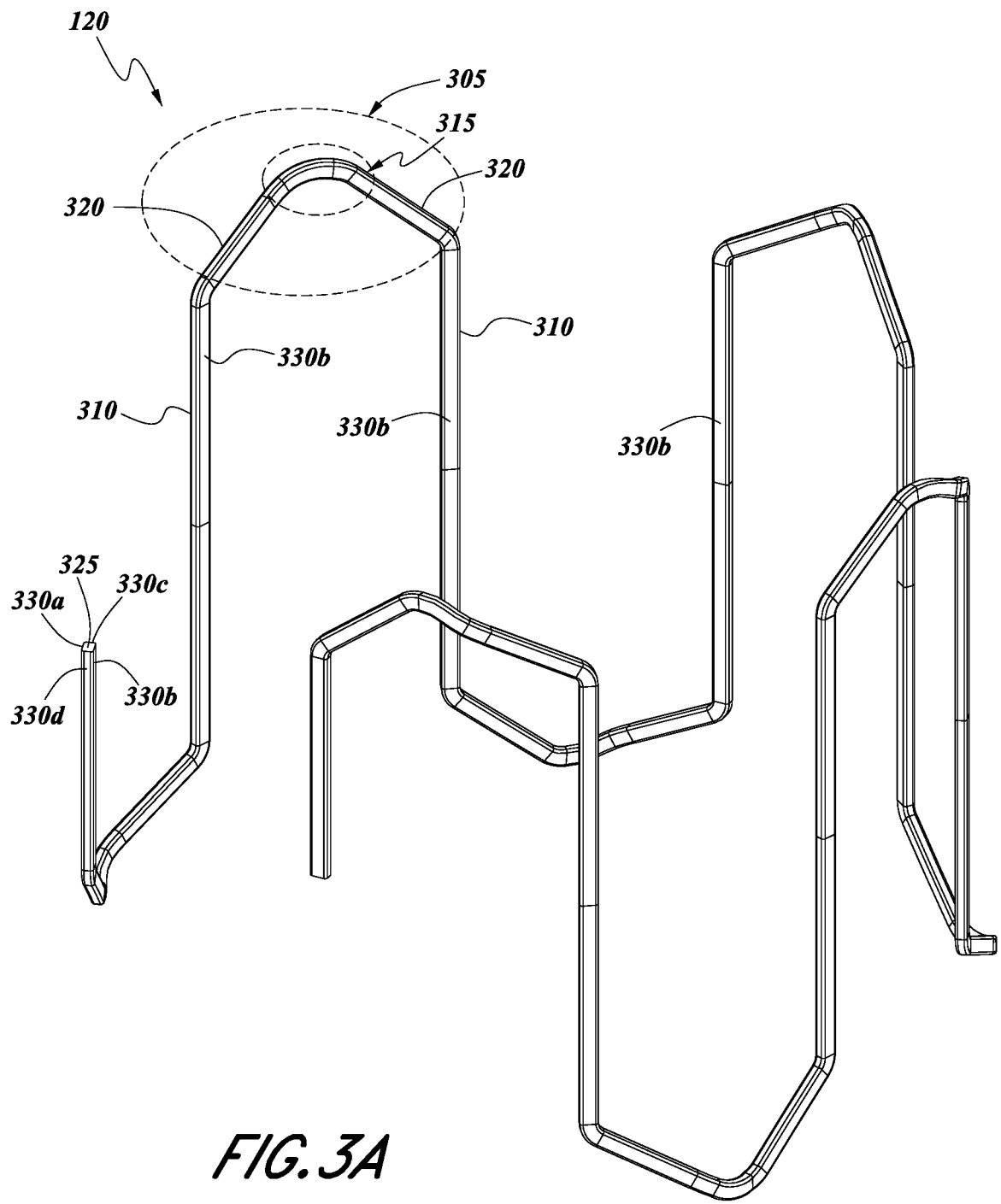
FIG. 3A illustrates a portion of the outer portion of the continuous winding of FIG. 1A.

FIG. 3A illustrates a portion of the outer portion 120 of the continuous winding of FIGS. 1A-1D. The outer portion 120 of the winding has a larger diameter when circularly wrapped and inserted into the stator than the inner portion 125 of the winding, and thus the crown 305 shape is adjusted accordingly. In some embodiments, the conductor of the outer portion 120 can be a continuation of the conductor of the inner portion 125 but formed with different compound bends as described herein. The winding includes a number of linear segments 310 positioned parallel to one another, with successive linear segments connected by crowns 305. The linear segments 310 can be radially inserted into the slots of a stator according to a determined winding pattern. The crown 305 includes two substantially straight segments 320 and a compound bend 315 at a peak of the crown between the straight segments 320, the compound bend 315 designed to not stress insulation of the winding conductor to failure.

The conductor of the winding has a rectangular cross-section 325 composed of a single, solid conductor or of a number of thin rectangular wires or strands. In other embodiments the conductor can have a square cross-section. The edges of the cross-section 325 define first 330B, second 330A, third 330C, and fourth 330D exterior faces of the conductor. The conductor can include an electrically insulating coating around its exterior faces 330A-330D.

FIG. 3B illustrates a side view 300A from a perspective orthogonal to the first exterior face 330B of the crown 305 of FIG. 3A as well as a portion of two successive linear segments 310 of the continuous winding. A first bend 335 of the compound bend 315 can be formed by shaping the conductor into a v-shape similar to the description of the v-shape formation with respect to FIG. 2B. Along with formation of the first bend 335, the straight segments 220 can each have an additional bend formed between the straight segment 220 and the connected linear segment 210.

FIG. 3C illustrates a top view 300B from a perspective orthogonal to the third exterior face 330C of the crown 305 of FIG. 3A. The second bend 355 of the compound bend 315 can be formed in the crown 305 after formation of the first bend 335. In the example of FIG. 3C, the second bend is formed by shaping the conductor into an asymmetrical v-shape with a radiused bend 345 between substantially straight segments 320. A small bend 355 is formed in one of the straight segments 320 such that the asymmetrical v-shape has a slight s-curvature. The s-shape is formed by compressing and elongating portions of the first and second exterior faces 230A, 230B. This shaping can be accomplished by applying force to the conductor along a second direction perpendicular to the first direction, similar to the discussion of FIG. 2C. The second bend 345, 355 can provide for a compact nesting configuration between adjacent crowns in a circular row of the winding when positioned in the stator.

The first 335 and second 345, 255 bends are designed such that the compression and elongation of the various exterior faces for formation of the compound bend 315 does not stress the insulating coating of the conductor to failure. Thus, in optimal conditions the compound bend 315 can provide for a continuous winding with no breaks in the insulation at the crowns 305.

The specific shaping of the first and second bends shown in FIGS. 2A-3C is provided for purposes of example and is not intended to limit the scope of possible compound bends in an insulation-preserving successive winding according to the present disclosure. The specific shaping of crown 205, 305 can be adjusted based on a number of factors including (1) the winding pattern, for example a number of slots that will be between successive linear segments 210, (2) stator dimensions including slot size and slot spacing, (3) a diameter of the winding as it is wound through the stator slots. In some examples successive crowns or groups of crowns may be shaped differently from one another as needed to achieve the desired winding pattern. The spirit of the disclosure encompasses any continuous winding having crowns the formation of which does not stress conductor insulation to failure, crowns formed such that the same exterior face of the conductor facing radially inward on all linear segments, and crowns shaped to form a compact nesting arrangement.

Figure 4:
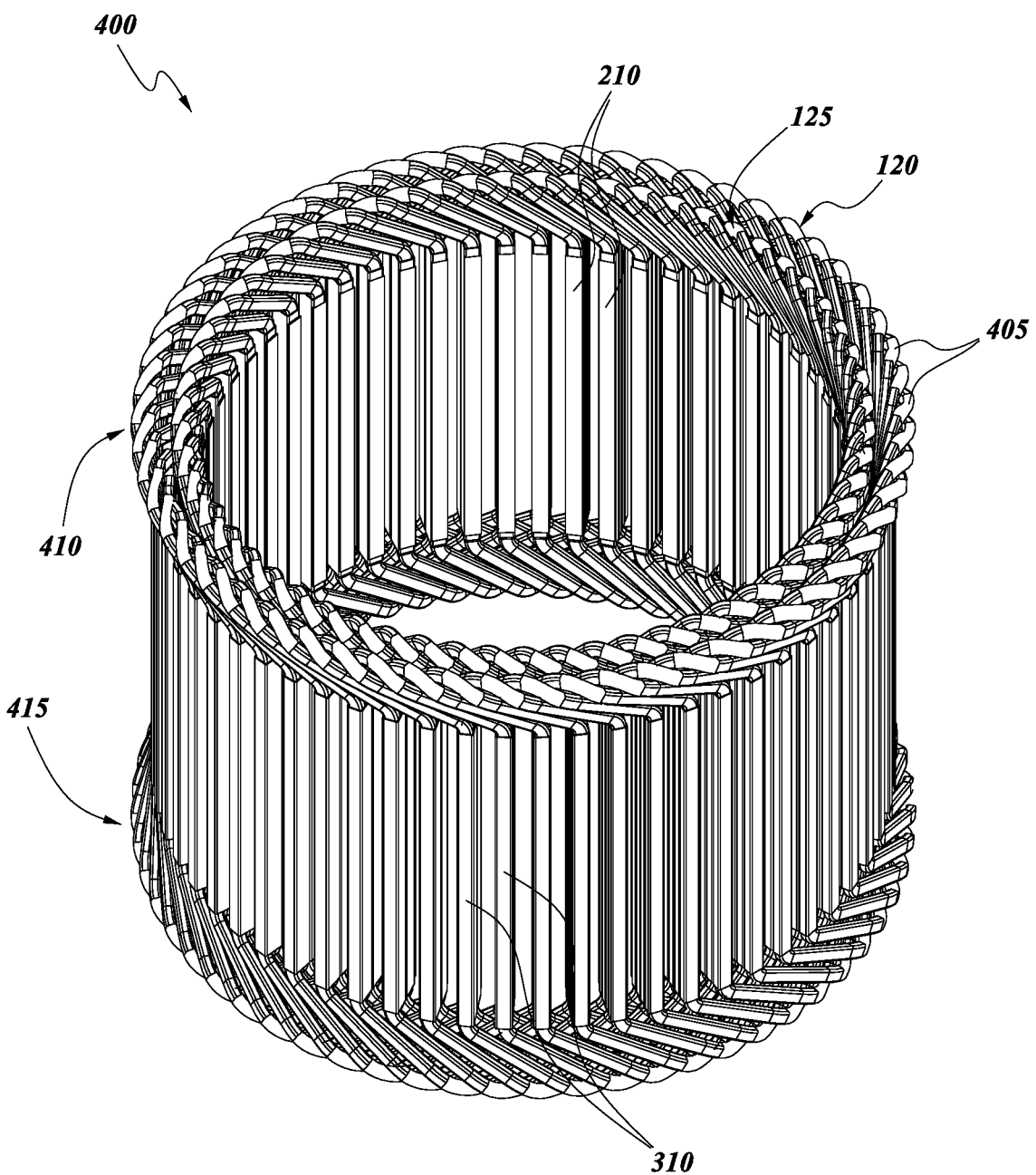
FIG. 4 illustrates the double-layer circular configuration of the continuous winding of FIGS. 1A-1D.

FIG. 4 illustrates the double-layer circular configuration 400 of the continuous winding having an inner circular row 125 and an outer circular row 120. The double-layer circular configuration 400 of the winding provides two linear 210, 310 segments of the conductor positioned in each stator slot. As illustrated, where a winding design includes four linear segments (two of each 210 and 310) per slot, the crowns of the winding or windings will form two circular rows 410, 415 that will cross over the end faces of the stator once inserted. To provide a compact nesting configuration between adjacent crowns in a circular row, the second bend of the compound bend in a crown can be shaped into the s-shape, the asymmetrical v-shape, or some blend of these two shapes depending on the desired radius of that circular row of the winding when positioned in the stator.

Some stators can have two double-layer circular windings inserted in each slot for a total of four conductors per slot. Some stators can have three or more of such windings inserted in each slot for six or more conductors per slot. Other embodiments of a continuous winding formed with insulation-preserving crowns as described herein can have just a single circular row, or can be shaped to form greater than two circular rows as needed for determined winding patterns.

Figure 5:
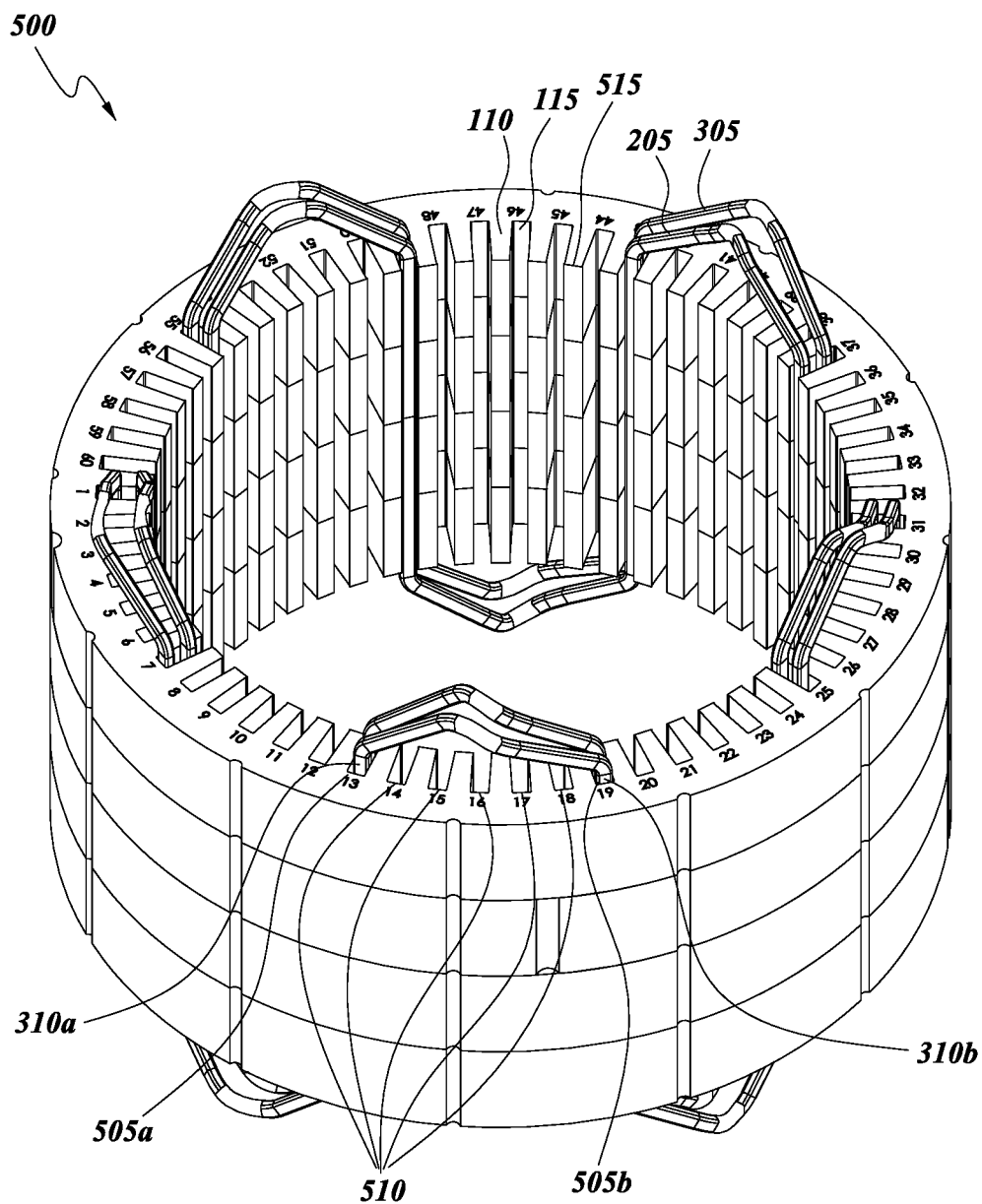
FIG. 5 illustrates a portion of the double-layer winding of FIG. 4 inserted into a stator.

FIG. 5 illustrates a stator winding 500 having a portion of the double-layer winding of FIG. 4 inserted into the stator. FIG. 5 illustrates how the crowns 205, 305 of the winding cross over the end face of the stator. FIG. 5 further illustrates how a first linear segment 310A of the winding is positioned in a first slot 505A and a successive linear segment 310B is positioned in a second slot 505B with a number of intervening slots 510 separating the first slot 505A from the second slot 505B. In the depicted example the number of intervening slots is five, however this can be altered according to the specifications of a given winding design.

Overview of Performance Examples

Figure 6A:
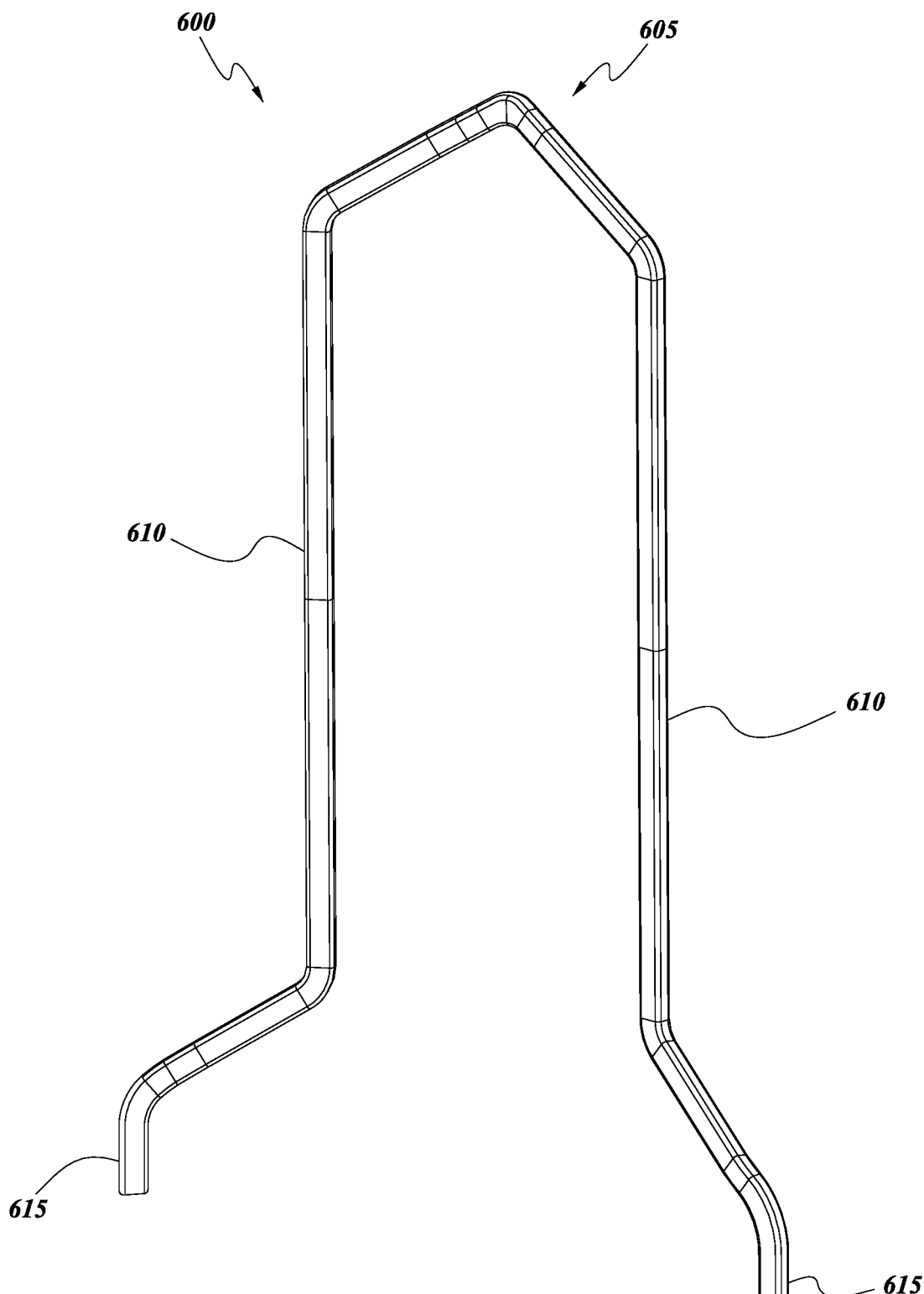
FIG. 6A illustrates a prior art hairpin stator winding.

FIG. 6A illustrates a prior art hairpin stator winding segment 600. As illustrated, conductor segments can be bent into U-shapes, such that the conductor segments form a crown 605 with two legs 610. These conductor segments 600 are often referred to as "hairpins" because of their shape. The example shown in FIG. 6A is illustrated with bends in the open end 615 of each leg. Such bends 615 can be formed prior to radial hairpin segment insertion or after axial insertion of the hairpin conductor 600 into the stator. The hairpin conductor 600 can be inserted into two slots through one end face of the stator. A number of hairpin conductors can be inserted to fill the slots of the stator and the open end 615 of each leg 610 can be bent as needed and welded to the open end of an adjacent hairpin leg according to the connection requirements of the windings. While this allows for axial insertion of the conductors, the many weld points at the open ends 615 of the hairpin conductors 600 creates weak points in the insulating coating that can lead to failure of the electric machine.

Figure 6B:
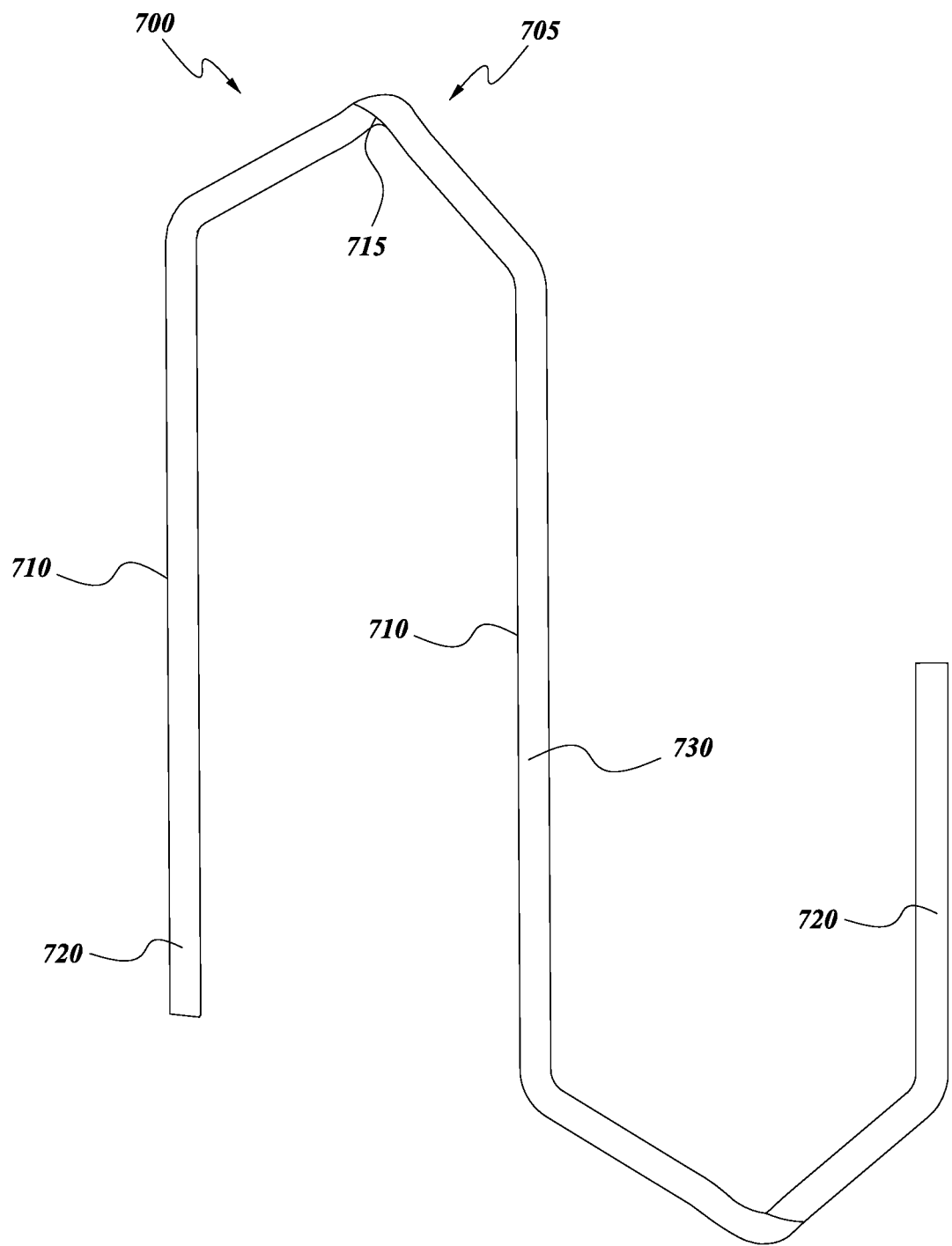
FIG. 6B illustrates a prior art continuous winding with transitional transpositions.

FIG. 6B illustrates a prior art continuous winding 700 with transitional transpositions 715. To avoid the weld problem of hairpin conductors, a continuous conductor can be wound into a wave pattern having a number of linear segments 710 connected by crowns 705. As illustrated, the crowns 705 forming the connections between the linear segments 710 each include a transitional transposition 715 of the conductor. In the transitional transposition 715, the conductor is folded over on itself such that a first face 720 of the rectangular conductor that faces a first direction in a first linear segment 710 crosses over in the transitional transposition 715 and thus faces in the opposite direction in a successive linear segment 710 in the winding, with the opposing face 730 facing in the first direction in the successive linear segment 710. At the transitional transposition 715 the winding has an increased thickness due to the conductor doubling over on itself, referred to as a "knuckle," which interferes with a compact arrangement of the crowns 705 when the winding 700 is inserted into a stator. As such, this knuckle in the conductor crown 705 is typically flattened to have the same thickness as the conductor without doubling. Such flattening breaks the insulating coating on the conductor, creating a failure point at each crown of the continuous winding. A typical winding 700 can have 90 to 100 of such crowns, and multiple windings can be positioned in a single stator.

The windings described above with respect to FIGS. 1A-5 overcome these failure points at the connecting points between linear segments by providing a compound bend in the crowns of a continuous winding, where the compound bend does not stress the conductor insulation to its failure point.

Overview of Example Drive Systems Implementing the Disclosed Electric Machines

Figure 7:
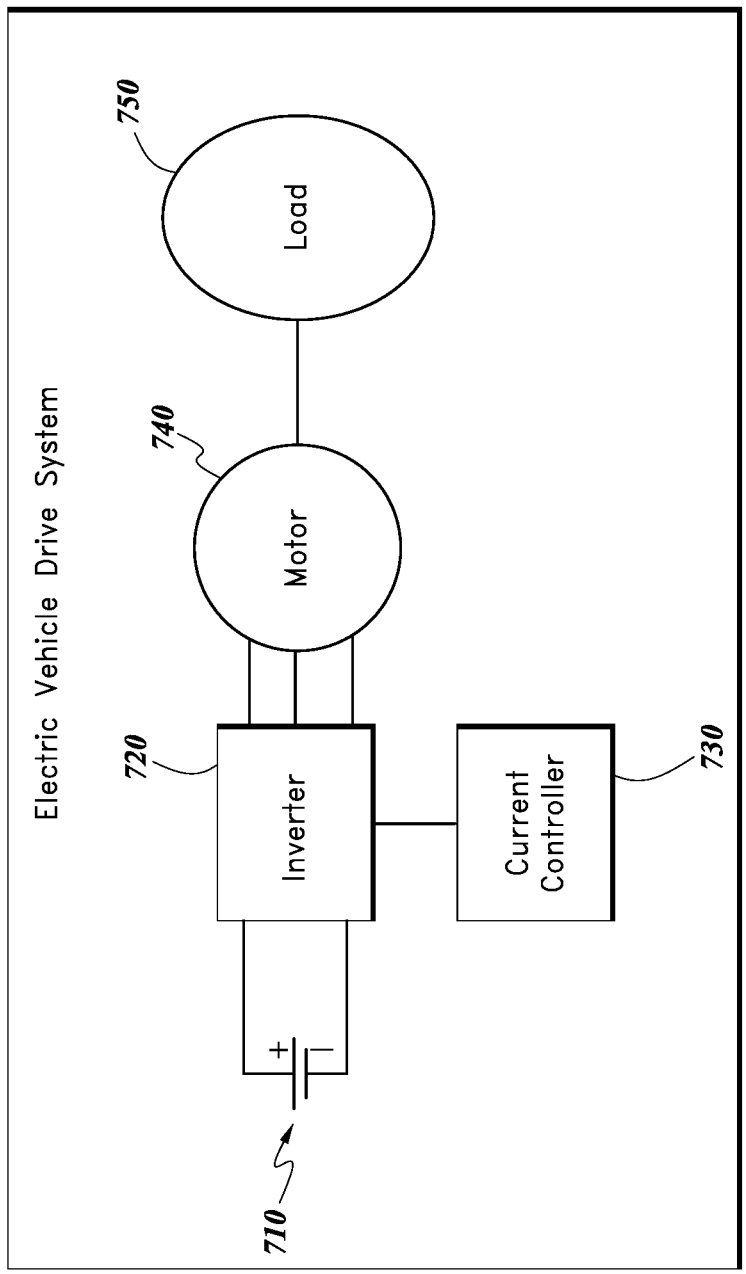
FIG. 7 illustrates a block diagram of an example electric vehicle drive system including an IPM motor having windings as described herein.

FIG. 7 depicts a block diagram of an example electric vehicle drive system 700 including a motor 740 having continuous windings such as those described herein. The electric vehicle drive system 700 includes a voltage source 710, inverter 720 coupled to the voltage source, current controller 730, motor 740, and load 750. The motor 740 can implement a stator having windings such as are disclosed herein, and in some embodiments can be an interior permanent magnet motor.

The voltage source 710 is typically a single phase direct current (DC) source; however, single and multi-phase alternating current (AC) outputs are also possible. In some embodiments, voltage source 710 represents a rechargeable electric vehicle battery or traction battery used to power the propulsion of an electric vehicle including the drive system 700.

Inverter 720 includes power inputs which are connected to conductors of the voltage source 710 to receive one of DC power, single-phase electrical current or multi-phase electrical current. Additionally, the inverter 720 includes an input which is coupled to an output of current controller 730, described further below. The inverter 720 also includes three outputs representing three phases with currents that can be separated by 120 electrical degrees, with each phase provided on a conductor coupled to the motor 740. It should be noted that in other embodiments inverter 720 may produce greater or fewer than three phases.

The motor 740 is fed from voltage source inverter 720 controlled by current controller 730. The inputs of motor 740 are coupled to respective windings distributed about a stator. The motor 740 can be coupled to a mechanical output, for example a mechanical coupling between the motor 740 and mechanical load 750. Mechanical load 750 may represent one or more wheels of the electric vehicle.

Controller 730 can be used to generate gate signals for the inverter 720. Accordingly, control of vehicle speed is performed by regulating the voltage or the flow of current from the inverter 720 through windings of the stator of the motor 740. There are many control schemes that can be used in the electric vehicle drive system 700 including current control, voltage control, and direct torque control. Selection of the characteristics of inverter 720 and selection of the control technique of the controller 730 can determine efficacy of the drive system 700.

Although not illustrated, the electric vehicle drive system 700 can include one or more position sensors for determining position of the rotor of motor 740 and providing this information to the controller 730. For example, the motor 740 can include a signal output that can transmit a position of a rotor assembly of the motor 740 with respect to the stator assembly motor 740. The position sensor can be, for example, a hall-effect sensor, potentiometer, linear variable differential transformer, optical encoder, or position resolver. The saliency exhibited by motor 740 can also allow for sensorless control applications. The saliency signature of motor 740 can be strong enough that it can be used to determine rotor position at standstill and low speed operating conditions. Some sensorless designs can use saliency mapping at low speeds and then transition to a back-EMF observer model as the motor 740 speeds up.

Although not illustrated, the electric vehicle drive system 700 can include one or more current sensors for determining phase currents of the stator windings and providing this information to the controller 730. The current sensor can be, for example, a hall-effect current sensor, a sense resistor connected to an amplifier, or a current clamp.

It should be appreciated that while the motor 740 is depicted as an electrical machine that can receive electrical power to produce mechanical power, it can also be used such that it receives mechanical power and thereby converts that to electrical power. In such a configuration, the inverter 720 can be utilized to excite the winding using a proper control and thereafter extract electrical power from the motor 740 while motor 740 is receiving mechanical power.

Implementing Systems and Terminology

Implementations disclosed herein provide continuously-wound, radially inserted stator windings for an electric machine with improved performance relating to the electrical insulation of the conductors.

The systems and methods above have been described in general terms as an aid to understanding details of preferred embodiments of the present invention. Other preferred embodiments of the present include the described application for interior permanent magnet motors and for electric vehicles. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, the term "or" as used herein is generally intended to mean "and/or" unless otherwise indicated. Combinations of components or steps will also be considered as being noted, where terminology is foreseen as rendering the ability to separate or combine is unclear. As used in the description herein and throughout the claims that follow, "a", "an", and "the" includes plural references unless the context clearly dictates otherwise. Also, as used in the description herein and throughout the claims that follow, meaning of "in" includes "in" and "on" unless the context clearly dictates otherwise. As used herein, the term "plurality" denotes two or more. For example, a plurality of components indicates two or more components. The phrase "based on" does not mean "based only on," unless expressly specified otherwise. In other words, the phrase "based on" describes both "based only on" and "based at least on."

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. An electric machine comprising:
   a rotor;
   a stator positioned around the rotor, the stator comprising:
      first and second end faces;
      a plurality of stator teeth extending inward toward the rotor;
      a plurality of slots each formed between adjacent stator teeth of the plurality of stator teeth, the plurality of slots extending between the first and second end faces and at least partially open toward the rotor; and
   a continuous winding passing successively through at least some of the plurality of slots of the stator, the continuous winding comprising:
      a conductor having a rectangular cross-section defining first, second, third, and fourth exterior faces of the conductor,
      a plurality of crowns formed in the conductor, each of the plurality of crowns comprising an insulating coating disposed about the conductor and disposed at one of the first and second end faces, and
      a plurality of linear segments of the conductor, wherein pairs of successive linear segments of the plurality of linear segments are connected by a crown of the plurality of crowns, and wherein each linear segment of the plurality of linear segments is positioned in a corresponding one of the plurality of slots with the first exterior face facing the rotor,
   wherein each of the plurality of crowns is disposed between different successive linear segments of the plurality of linear segments,
   wherein the plurality of crowns includes at least one crown having a first compound bend formed from a number of bends and at least one other crown having a second compound bend formed from at least a different number of bends as compared to the first compound bend; and
   wherein the continuous winding forms two layers of windings, the first layer of windings comprising a first subset of the plurality of linear segments and a first subset of the plurality of crowns and the second layer of windings comprising a second subset of the plurality of linear segments and a second subset of the plurality of crowns, each of the first subset of linear segments being different from each of the second subset of linear segments and each of the first subset of crowns being different from each of the second subset of crowns, and the first subset of crowns and the second subset of crowns do not overlap with each other in a direction orthogonal to the first and second end faces.

2. The electric machine of claim 1, wherein each crown of the plurality of crowns comprises first and second straight segments joined by a bent segment, wherein the bent segment includes the first compound bend formed in the conductor at a peak of the crown.

3. The electric machine of claim 2, wherein the first and second exterior faces of the conductor are opposing and the third and fourth exterior faces of the conductor are opposing, and wherein the first compound bend includes:
   when viewed from a perspective orthogonal to the first and second exterior faces, a first bend formed from one bend that is v-shaped, and
   when viewed from a perspective orthogonal to the third and fourth exterior faces, a second bend formed from two bends that is s-shaped.

4. The electric machine of claim 3, wherein the first and second exterior faces of the conductor are opposing and the third and fourth exterior faces of the conductor are opposing, and wherein the second compound bend includes:
   when viewed from a perspective orthogonal to the first and second exterior faces, a third bend formed from one bend that is v-shaped, and
   when viewed from a perspective orthogonal to the third and fourth exterior faces, a fourth bend formed from one bend and different from the second bend that is v-shaped.

5. The electric machine of claim 1, wherein each of the plurality of crowns is positioned outside of the stator passing across a portion of one of the first and second end faces.

6. The electric machine of claim 5, wherein successive crowns of the plurality of crowns formed in the conductor pass across opposing end faces of the first and second end faces of the stator.

7. The electric machine of claim 1, wherein the bent segment of a crown of the plurality of crowns nests with the bent segment of an adjacent crown of the plurality of crowns on a respective end face of the first and second end faces.

8. The electric machine of claim 1, wherein the first subset of crowns has a first shape and the second subset of crowns has a second shape, the first shape different from the second shape.

9. The electric machine of claim 1, wherein the first subset of crowns forms a first circular row crossing over the first and second end faces of the stator and the second subset of crowns forms a second circular row crossing over the first and second end faces of the stator, and wherein the first circular row does not overlap with the second circular row.

10. A stator for an electric machine, the stator comprising:
   an inner diameter and an outer diameter;
   first and second end faces;
   a plurality of stator teeth extending inward toward the inner diameter;
   a plurality of slots each formed between adjacent stator teeth of the plurality of stator teeth, the plurality of slots extending between the first and second end faces and at least partially open along the inner diameter;
   a continuous winding passing successively through at least three slots of the plurality of slots, the continuous winding comprising a conductor having a rectangular cross-section defining at least a first exterior face of the conductor, the continuous winding positioned in each of the at least three slots with the first exterior face facing the inner diameter, the continuous winding further comprising an insulating coating disposed about at least a portion of the conductor external to the slots, a first continuous portion of the continuous winding forming a first layer of windings around the inner diameter of the stator and a second continuous portion of the continuous winding, different from the first portion, forming a second layer of continuous windings around an inner diameter of the first layer of windings, wherein the first layer of windings has a larger diameter than the second layer of windings and wherein the first layer of windings does not overlap with the second layer of windings at either of the first and second end faces in a direction orthogonal to the first and second end faces.

11. The stator of claim 10, wherein the continuous winding comprises a plurality of linear segments of the conductor, each pair of successive linear segments of the plurality of linear segments connected by one of a plurality of crowns formed in the conductor.

12. The stator of claim 11, wherein each crown of the plurality of crowns comprises first and second straight segments joined by a compound bend formed in the conductor.

13. The stator of claim 12, wherein the first and second straight segments of each crown of the plurality of crowns is angled toward the outer diameter of the stator.

14. The stator of claim 10, wherein a first of the at least three slots is separated from a second of the at least three slots by five other slots of the plurality of slots.

15. The stator of claim 10, wherein the continuous winding is radially inserted into the at least three slots.

16. A continuous stator winding comprising:
a conductor having a rectangular cross-section defining first, second, third, and fourth exterior faces of the conductor, the first exterior face opposing the second exterior face, the third exterior face opposing the fourth exterior face;
a plurality of linear segments formed in the conductor, each linear segment of the plurality of linear segments positioned parallel to the other linear segments of the plurality of linear segments; and
a plurality of crowns formed in the conductor, each crown of the plurality of crowns comprising first and second straight segments joined by a bent segment and connecting successive linear segments of the plurality of linear segments such that, when the conductor is radially wound, the first exterior face of each of the plurality of linear segments faces inward, each of the plurality of crowns comprising an insulating coating disposed about the conductor,
wherein the bent segment is designed such that compression and elongation of exterior faces of the insulating coating at the bent segment do not stress the insulating coating at the bent segment to failure;
wherein the bent segment of a first subset of the plurality of crowns is formed having a first compound bend with a number of bends, wherein the bent segment of a second subset of the plurality of crowns is formed having a second compound bend with a different number of bends than the first compound bend; and
wherein the continuous stator winding is wound into a double-layer circular configuration, the double-layer circular configuration comprising:
a first continuous length of the conductor including the first subset of the plurality of crowns wound into an inner circular row, and
a second continuous length of the conductor, different from the first continuous length of the conductor, including the second subset of the plurality of crowns wound into an outer circular row,
wherein the first and second subsets of the plurality of crowns do not overlap with each other in a direction orthogonal to first and second end faces of a stator about which the conductor is wound.

17. The continuous stator winding of claim 16, wherein the bent segment includes a compound bend formed in the conductor.

18. The continuous stator winding of claim 17, wherein the compound bend includes:
when viewed from a perspective orthogonal to the first and second exterior faces, a v-shaped bend, and
when viewed from a perspective orthogonal to the third and fourth exterior faces, an s-shaped bend.

19. The continuous stator winding of claim 17, wherein the compound bend includes:
when viewed from a perspective orthogonal to the first and second exterior faces, a first v-shaped bend, and
when viewed from a perspective orthogonal to the third and fourth exterior faces, a second v-shaped bend.

20. The continuous stator winding of claim 16, wherein the insulating coating is contiguous along the bent segment of each of the plurality of crowns.

21. The continuous stator winding of claim 16, wherein the bent segment of a first subset of the plurality of crowns is formed having a first compound bend, wherein the bent segment of a second subset of the plurality of crowns is formed having a second compound bend shaped differently than the first compound bend.

22. The continuous stator winding of claim 21, wherein the continuous stator winding is wound into a double-layer circular configuration, the double-layer circular configuration comprising:
a first length of the conductor including the first subset of the plurality of crowns wound into an inner circular row, and
a second length of the conductor including the second subset of the plurality of crowns wound into an outer circular row.

* * * * *